United States Patent [19]

Bork, Jr. et al.

[11] Patent Number: 4,530,373
[45] Date of Patent: Jul. 23, 1985

[54] PRESSURE RELIEF VALVE

[75] Inventors: Carl R. Bork, Jr., Euclid; William C. Steiss, Parma; William P. Tobbe, Lyndhurst; Earl D. Shufflebarger, Mentor; Stephen Matousek, Chagrin Falls; Thomas J. Gardner, Kirtland, all of Ohio

[73] Assignee: Nupro Company, Willoughby, Ohio

[21] Appl. No.: 468,780

[22] Filed: Feb. 22, 1983

[51] Int. Cl.³ .............................................. F16K 17/06
[52] U.S. Cl. ................................ 137/516.29; 137/538; 137/540; 251/172; 251/360
[58] Field of Search .................... 137/516-529, 137/533.31, 538, 540; 251/172, 361, 364, 360

[56] References Cited

U.S. PATENT DOCUMENTS

| | | | |
|---|---|---|---|
| 1,702,550 | 2/1929 | Stevenson | 137/538 |
| 2,686,534 | 8/1954 | Montelius | 137/540 |
| 2,737,974 | 3/1956 | Renick | 137/540 |
| 2,854,021 | 9/1958 | Baldwin, Jr. et al. | 251/361 |
| 2,985,424 | 5/1961 | Anderson et al. | 251/360 |
| 3,289,694 | 12/1966 | Frye | 137/513.7 |
| 3,425,444 | 2/1969 | Jones | 137/540 |
| 3,529,622 | 9/1970 | Weise et al. | 137/516.29 |
| 3,770,008 | 11/1973 | Turney | 137/516.29 |

FOREIGN PATENT DOCUMENTS 395654 12/1973 U.S.S.R. ..................... 137/533.31

Primary Examiner—Alan Cohan
Assistant Examiner—John A. Rivell
Attorney, Agent, or Firm—Fay & Sharpe

[57] ABSTRACT

A pressure relief valve includes a valve body having an axial inlet port and a lateral outlet port, with an enlarged bore extending between such ports. A valve bonnet attached to the valve body slidably guides a poppet for movement between closed and open positions for closing and opening the inlet port. A seal ring positioned in the bore adjacent the inlet port sealingly surrounds the poppet in its closed position. The seal ring is axially compressed between a retainer ring and a backup surface, and a ring nut threaded in the bore compressively engages the retainer ring. The ring nut is located entirely on the inlet port side of the outlet port so it does not inhibit flow to the outlet port when the poppet is open. A poppet guide bore in the bonnet extends inwardly from a bonnet end surface, and a pair of concentric recesses of different diameters also extend into the bonnet from the end surface. One recess receives a seal ring positioned in surrounding sealing relationship with the poppet, and the other recess receives a push-in retainer for retaining the seal ring in its recess. A small diameter stem on the poppet extends into a bonnet spring receiving bore and has a rounded end received by a conical recess in a guide disc. Close fitting cylindrical locating surfaces are used for providing accurate concentricity between the bonnet and body, and between the retainer ring and the bore.

16 Claims, 2 Drawing Figures

PRESSURE RELIEF VALVE

BACKGROUND OF THE INVENTION

This invention relates to the art of valves and, more particularly, to pressure relief valves. Although the invention will be described with particular reference to a pressure relief valve, it will be recognized that certain features thereof may be used or adapted to use in valves of other types.

Pressure relief valves of a known type include a valve body and a valve bonnet assembled together in a cooperative relationship. The valve body includes an axial inlet port and a lateral outlet port, with an enlarged bore providing communication therebetween. A poppet is slidably guided in the bonnet for movement between open and closed positions for respectively opening and closing the inlet port. A seal ring is positioned in the bore adjacent the inlet port for sealingly surrounding the poppet in its closed position. The seal ring is axially compressed by a retainer ring which is directly engaged by the bonnet itself, and extends completely past the outlet port through the bore so that lateral openings must be provided in the retainer ring to allow flow therethrough from the inlet port to the outlet port. Because of the particular construction involved, the bonnet to valve body seal may not be as effective as desired.

It has, therefore, been considered desirable to develop a new and improved pressure relief valve which would overcome the foregoing difficulty while providing better and more advantageous overall results.

BRIEF SUMMARY OF THE INVENTION

A pressure relief valve of the type described includes a retainer ring of very small axial thickness and a separate nut threaded into the valve body bore for compressively engaging the retainer ring. The ring nut is located entirely on the inlet port side of the outlet port so the retainer ring and the ring nut do not inhibit lateral flow from the bore through the outlet port. The retainer ring and bore have cooperating smooth cylindrical locating surfaces to provide more accurate concentricity than is possible between cooperating threads. The threads in the bore between the outlet port and the retaining ring are substantially filled by the ring nut so that such threads will not become fouled or otherwise damaged during valve use, and removal of the ring nut for changing the seal ring is thus facilitated. The central opening through the ring nut is non-circular to receive a tool used for nut installation or removal.

The valve bonnet has an externally threaded projection threadably received in the valve body bore. The valve body bore has an internal smooth cylindrical locating surface adjacent its open end for cooperation with an external smooth cylindrical locating surface on the bonnet. The peak diameter of the threads on the bonnet projection is less than the diameter of the internal cylindrical locating surface so that the two smooth locating surfaces cooperate to provide concentricity instead of relying on cooperating threads. The bonnet has an outwardly extending shoulder engaging an end surface on the valve body when the projection is fully received in the valve body bore. A chamfer extends between the end surface and the internal smooth cylindrical locating surface to define a cavity in which a seal ring is compressed to provide a fluid tight seal between the bonnet and the valve body bore.

The poppet is slidably guided in a poppet guide bore in the bonnet projection extending inwardly from a bonnet end surface on the end of the projection. First and second concentric recesses extend into the projection from the end surface. The first recess receives a seal ring which sealingly surrounds the poppet and the second recess receives a push-in seal retainer. The poppet has a small diameter stem extending into a spring receiving bore and a rounded end on the stem is received by a conical recess in a guide disc engaged by a coil spring on the opposite side thereof from the poppet stem for normally biasing the poppet to a closed position.

The principal focus of the present invention is the provision of an improved pressure relief valve.

One advantage of the invention is the provision of such a pressure relief valve with improved seals at certain locations therein.

Another advantage of the invention is the provision of a pressure relief valve which does not inhibit flow laterally from a valve body bore to an outlet port.

An additional advantage of the invention is the provision of an improved relationship between a rounded end on a poppet stem and a spring guide disc.

Still other advantages of the invention will become apparent to those skilled in the art upon a reading and understanding of the following detailed description.

BRIEF DESCRIPTION OF THE DRAWINGS

The invention may take form in certain parts and arrangements of parts, preferred embodiments of which will be described in detail in the specification, and wherein.

DESCRIPTION OF PREFERRED EMBODIMENTS

Figure 1:
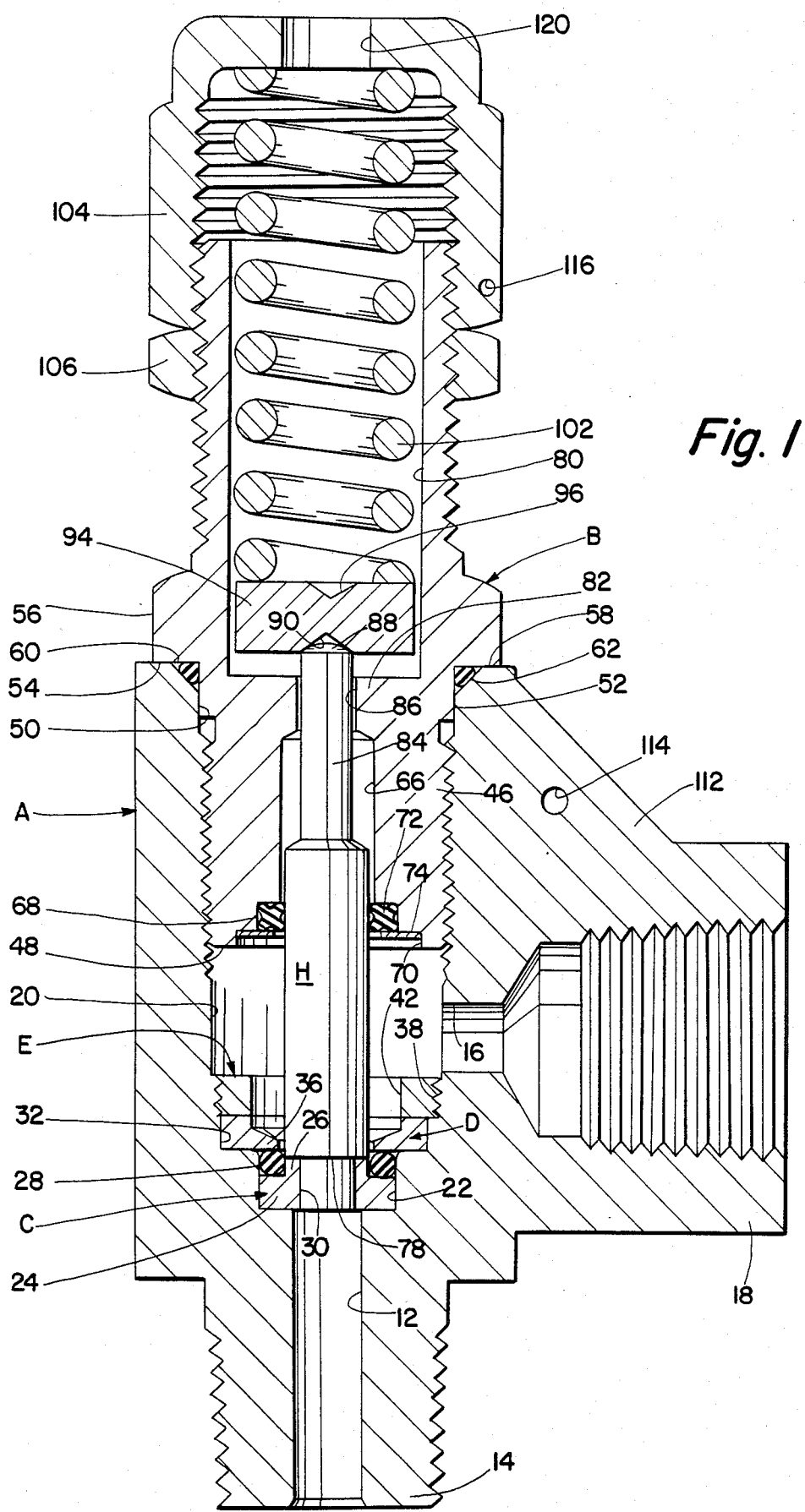
FIG. 1 is a cross-sectional elevational view of a pressure relief valve constructed in accordance with the present invention; and, FIG. 2 is a view similar to FIG. 1 showing a modified form of the upper bonnet portion of the valve for allowing manual purging.

With reference to the drawings, wherein the showings are for purposes of illustrating preferred embodiments of the invention only and not for purposes of limiting same, FIG. 1 shows a pressure relief valve including a valve body A cooperating with a valve bonnet B. Valve body A includes an axial inlet port 12 concentric with an externally threaded boss 14 for connection to a fitting. A lateral outlet port 16 is axially spaced from inlet port 12 and is concentric with an internally threaded boss 18 adapted for connection with a suitable fitting. An enlarged bore 20 in valve body A connects inlet and outlet ports 12,16. It is to be appreciated that bosses 14, 18 may take other forms than the specific threaded arrangements shown for accommodating various valve installations. Such modifications do not, however, depart from the overall intent or scope of the invention.

A small diameter cylindrical recess 22 at the bottom of bore 20 has a diameter somewhat larger than inlet port 12 and is concentric therewith. Recess 22 has a smooth cylindrical outer surface closely receiving a corresponding smooth external cylindrical surface on a laterally projecting portion 24 of an insert C. An axially projecting portion 26 of insert C extends in a direction away from inlet port 12 and has a radial thickness substantially less than the radial thickness of laterally projecting portion 24. Thus, the upper surface of laterally projecting portion 24, the surface of recess 22 and the outer cylindrical surface of axial projection 26 cooperate to define a circumferential receiving groove in which a seal ring defined by O-ring 28 is received. O-ring 28 preferably has a diameter somewhat greater than the axial and radial dimensions of the groove in which it is received. Also, axial projection 26 preferably extends at least slightly beyond the center or midpoint of O-ring 28. A central opening 30 extending through insert C is slightly smaller in diameter than inlet port 12.

Bore 20 has a smooth cylindrical locating surface 32 adjacent the bottom end thereof for closely receiving a corresponding external smooth cylindrical surface on a seal ring retainer D. Retainer ring D has an inwardly extending projection 36 overlying O-ring 28 for compressing same within its receiving groove. The space between the opposed edges of insert projection 26 and retainer ring projection 36 is substantially smaller than the diameter of O-ring 28 so that the O-ring will not be extruded through such space under the influence of fluid pressure acting through inlet port 12 around the outer surface of insert C. The upper surface of retainer ring projection 36 is tapered or sloped toward inlet port 12 for guiding a poppet should it be necessary.

Valve body bore 20 is threaded as at 38 between outlet port 16 and smooth cylindrical locating surface 32. A ring nut E has external threads cooperatively engaging bore threads 38 and compressively engages retainer ring D. The nut ring acts to bottom out the retainer ring against the bottom of bore 20 and to axially compress O-ring 28. In turn, axial compression of the O-ring results in a lateral or radial bulging of the ring. The axial thickness of ring nut E is such that there are no bore threads 38 exposed to fluid so they will not become gummed up or fouled. This means that removal of ring nut E is readily accomplished for replacement of O-ring 28. Internal opening 42 through ring nut E is of a non-circular configuration and may, for example, be hexagonal for purposes of receiving a correspondingly shaped tool used to install or remove the ring nut.

It will be recognized that both retainer ring D and ring nut E are located entirely on the side of outlet port 16 extending toward inlet port 12. In other words, ring nut E and retainer ring D are located entirely between outlet port 16 and inlet port 12. Thus, retainer ring D and ring nut E do not inhibit lateral flow of fluid from valve body bore 20 to outlet port 16.

The axial length of bore 20 which is intersected by outlet port 16 is smooth and unthreaded. Elimination of threads at the area of communication between outlet port 16 and bore 20 also eliminates the necessity for a costly deburring process during valve manufacture. Any burrs at this area could otherwise break away during valve use and contaminate the fluid system involved. Moreover, this portion of bore 20 has a sufficiently large diameter for allowing movement of ring nut E therethrough.

Bonnet B has an externally threaded axial projection 46 threadably received in a threaded portion of bore 20 and includes a bonnet end surface 48. An internal smooth cylindrical locating surface 50 is provided in bore 20 adjacent the open outer end thereof for close cooperation with an external smooth cylindrical locating surface 52 on bonnet B adjacent a shoulder 54 on a bonnet external projection 56. Projection 56 desirably has a hexagonal or other polygonal external shape.

When projection 46 is fully received in bore 20, shoulder 54 engages end surface 58 adjacent the open end of bore 20. A generally conical chamfer 60 is provided at the open end of bore 20 extending between valve body end surface 58 and internal cylindrical locating surface 50 to define a seal receiving cavity. The cavity has a generally triangular cross-section as shown in FIG. 1 and is defined by a portion of bonnet shoulder 54, a portion of external cylindrical locating surface 52 on bonnet B and by the surface of chamfer 60. A seal ring in the form of an O-ring 62 is received and compressed in the cavity for providing a fluid tight seal between bonnet B and valve body bore 20.

The externally threaded portion of bonnet projection 46 has a thread peak diameter less than the diameter of internal smooth cylindrical locating surface 50. Also, the peak diameter of the external threads on ring nut E is less than the peak diameter of the internal threads in bore 20 which receive projection 46. The external diameter of retainer ring D is such that it will readily move past the bore threads receiving ring nut E.

A poppet guide bore 66 extends centrally into bonnet projection 46 from bonnet end surface 48 for receiving and slidably guiding an elongated poppet H. Cylindrical first and second recesses 68,70 extend into projection 46 from bonnet end surface 48 concentric with poppet guide bore 66. A seal ring defined by quad ring 72 is positioned in first recess 68 in surrounding sealing relationship with poppet H. In those cases where a high degree of poppet sensitivity is necessary and/or desired, quad ring 72 may be advantageously coated with polytetrafluoroethylene or other suitable lubricant for reducing drag on poppet H. In like manner, the poppet itself may also be coated with a suitable lubricant to enhance drag reduction. A push-in retainer 74 is secured within second recess 70. The axial extent of second recess 70 is substantially less than the axial extent of first recess 68.

Push-in retainer 74 is of the type having a plurality of circumferentially-spaced teeth on the outer periphery thereof. The teeth are initially inclined relative to the longitudinal axis of the retainer in the general manner of a toothed lock washer or the like, so the external diameter of the retainer creates an interference fit when eceived within psecond recess 70. Retainer 74 is press fit in second recess 70 by an axial force. When the retainer 74 is bottomed out in second recess 70, the teeth are bent in such a manner that they bite into the peripheral wall of the second recess for securing the retainer therein. The thickness and strength of retainer 74 are such that it can be readily removed from recess 70 as necessary for changing quad ring 72. The central opening through seal retainer 74 is larger than poppet H, but substantially smaller than the median diameter of seal ring 72 in order that the seal ring will be effectively retained within first recess 68.

Poppet H has a flat bottom end 78 which engages insert axial projection 26. Poppet H moves axially between closed and open positions for closing and opening, respectively, inlet port 12. In the closed position of poppet H, O-ring 28 makes surrounding sealing engagement therewith through the space between insert axial projection 26 and retainer ring lateral projection 36. It should be noted, however, that poppet bottom end 78 engages O-ring 28 at substantially the corner area between the bottom end and the peripheral side wall. This relationship provides a number of advantageous results which enhance the benefits received from the subject new valve. For example, it prevents any undesired sticking action between the poppet and O-ring 28 which could otherwise cause variations in the force required to effect poppet cracking, improves valve opening pressure sensitivity, and provides better repeatability on opening. Moreover, because the inside diameter of O-ring 28 is dimensionally close to the outside diameter of the poppet, the valve re-seal pressure will be fairly close to the cracking pressure. To maintain the requisite spacial relationship between poppet lower end 78 and O-ring 28, insert C, and particularly axial projection 26 thereof, is dimensioned to provide a positive stop for the poppet in the desired poppet closed position as noted above.

Bonnet B has a cylindrical spring receiving bore 80 on the opposite side of a dividing wall 82 from poppet guide bore 66. A small diameter poppet stem 84 extends closely through a hole 86 in dividing wall 82 into spring receiving bore 80. Stem 84 includes a rounded end 88 received by a central conical recess 90 in one face of a substantially flat, circular guide disc 94. Guide disc 94 includes another central conical recess 96 in the opposite face thereof for allowing assembly of such disc in either of two inverted positions while insuring reception of rounded stem 88 in a conical recess. Using a rounded stem end and a recess not correspondingly shaped has been found to give better guiding action to prevent cocking of the guide disc within bore 80. Further, the tapered interface between poppet stem 84 and the main poppet body cooperates with the tapered interface between opening 86 and bore 66 to provide a positive stop for the poppet in the poppet fully opened position.

A coil spring 102 received in poppet spring receiving bore 80 defines a biasing means for normally biasing poppet H to its closed position. Coil spring 102 is compressed between guide disc 94 and an internally threaded cap 104 threaded onto externally threaded bonnet B. Axial adjustment of cap 104 varies the cracking pressure of poppet H. A lock nut 106 externally threaded on bonnet B engages cap 104 to advantageously lock the cap in its axially adjusted position.

In the arrangement shown in FIG. 1, valve body A includes a thin web 112 having a small hole 114 penetrating therethrough. In like manner, cap 104 has a small hole 116 extending through a portion thereof. A suitable wire may be passed through holes 114,116 and sealed under tension for protecting against unauthorized adjustment of cap 104. Such action thus prevents unauthorized variation in the valve cracking pressure.

In operation of the valve, and when the fluid pressure acting against bottom end 78 of poppet H is greater than the biasing force of spring 102, poppet H will move upwardly in FIG. 1 away from its seated position on insert axial projection 26. This will allow fluid flow from inlet port 12 through bore 20 to outlet port 16. When the fluid pressure acting on poppet H is less than the biasing force of spring 102, the poppet will return to its closed position. The subject new valve construction assures that fluid flow from inlet port 12 to outlet port 16 through bore 20 is not inhibited laterally by either retainer ring D or ring nut E. As will be seen in FIG. 1, the body of poppet H disposed between seal rings 28,72 has a constant diameter over the length thereof. This relationship advantageously prevents any back pressures entering the relief valve from outlet port 16 from altering the poppet cracking pressure required at inlet port 12.

In the arrangement shown and described, full fluid pressure acts against the entire end face 78 of poppet H. In addition, fluid pressure acts between poppet end face 78 and the end of insert axial projection 26 against O-ring 28 while fluid pressure also acts around the outside periphery of insert C on O-ring 28. This latter fluid pressure action urges O-ring 28 toward engagement with the poppet to insure a more positive sealing relationship therebetween. The general balancing of pressure forces on O-ring 28 minimizes the possibility that it will be extruded through the space between insert C and retainer D.

Figure 2:
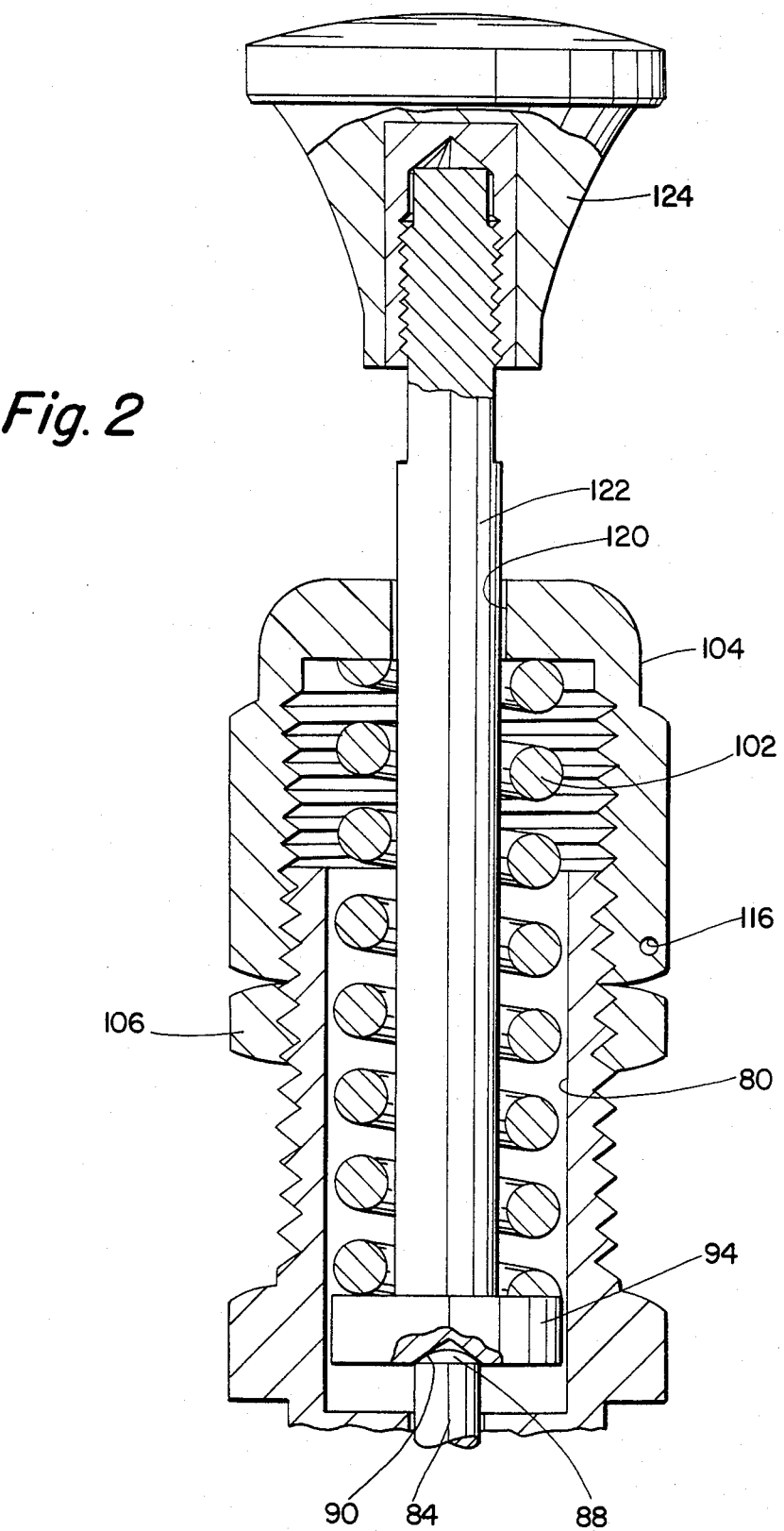

In the arrangement of FIG. 1, a central opening 120 through cap 104 simply provides an atmospheric relief vent. In the arrangement of FIG. 2, an elongated rod 122 slidably extends through cap hole 120 and is carried by or integral with guide disc 94 on the face thereof opposite from poppet stem 84. An enlarged knob 124 secured to the outer end of rod 122 allows rod 122 and guide disc 94 to be manually moved away from poppet stem 84 so that purging of a system can be carried out at any time desired. Moreover, it is possible to provide various alternative means (not shown) for locking rod 122 in a position whereby no biasing force will be exerted on the poppet for biasing it toward the closed position.

It will be recognized that it is also possible to enlarge poppet H within ring nut E in a location spaced from poppet end surface 78 to provide a larger surface area against which fluid pressure may act once the poppet opens slightly. Thus, once the poppet cracks open, there would be more rapid action of the poppet to its full open position due to the larger area acted upon by fluid pressure. Such a conformation, for example, may comprise an increase in the diameter of poppet H at a location axially spaced therealong a short distance from bottom end 78 generally at the area surrounded by ring E in the poppet closed position.

Also, in the embodiment of FIG. 1, it will be recognized that it is possible to place a protective cover over cap 104, locknut 106 and bonnet projection 56 to prevent unauthorized tampering with cap 104 and locknut 106. Such a protective cover may have a suitable small hole therethrough for wiring and sealing with valve body A in the manner described with respect to holes 114,116 in valve body A and cap 104.

Although the invention has been shown described with reference to preferred embodiments, it is obvious that alterations and modifications will occur to others upon a reading and understanding of this specification. The invention includes all such alterations and modifications insofar as they come within the scope of the claims or the equivalents thereof.

Having thus described the invention, it is now claimed:

1. A pressure relief valve comprising:
a valve body having an inlet port and a lateral outlet port spaced from said inlet port, an enlarged bore between said ports, a poppet slidably guided between closed and open positions for respectively closing and opening said inlet port, biasing means for normally biasing said poppet to said closed position, a seal ring in said bore adjacent said inlet port in surrounding sealing relationship with said poppet in said closed position thereof, said seal ring being axially compressed between a retainer ring and a backup surface, an externally threaded ring nut threaded into said bore and compressively engaging said retainer ring, said ring nut being located in said bore entirely on the inlet port side of said outlet port, said valve body having stop means inwardly of said seal ring, and said stop means being engageable by said poppet in said closed position thereof.

2. The valve as defined in claim 1 wherein said backup surface and said stop means are on an insert received in said valve body.

3. The valve as defined in claim 1 wherein said poppet has a substantially flat end engaging said stop means in said closed position of said poppet, said poppet having a peripheral side wall intersecting said substantially flat poppet end at a corner area, and said seal ring engaging said peripheral side wall of said poppet closely adjacent said corner area in said closed position of said poppet.

4. The valve as defined in claim 1 including a bonnet threaded into said bore on the opposite side of said outlet port from said inlet port, said poppet being slidably guided in said bonnet, said bore having a larger diameter on the opposite side of said outlet port from said inlet port than on the inlet port side of said outlet port, and said bore being unthreaded along the length thereof intersected by said outlet port.

5. The valve as defined in claim 4 wherein said bonnet has a bonnet end surface facing toward said inlet port, a poppet guide bore extending into said bonnet from said bonnet end surface, a cylindrical first recess having a diameter substantially larger than said poppet guide bore and extending into said bonnet from said bonnet end surface coincidental with said poppet guide bore, a cylindrical second recess having a diameter substantially larger than said first recess and extending into said bonnet from said bonnet end surface coincidental with said poppet guide bore, a seal ring positioned in said first recess in surrounding sealing relationship to said poppet, and a push-in retainer secured within said second recess for retaining said seal ring in said first recess.

6. The valve as defined in claim 5 wherein said second recess has an axial length which is substantially less than the axial length of said first recess.

7. The valve as defined in claim 4 wherein said poppet biasing means comprises a coil spring and said bonnet has a spring receiving bore on the opposite side of a dividing wall from said poppet guide bore, said dividing wall having an opening therethrough and said poppet having a small diameter stem extending through said opening into said spring receiving bore, said stem having a rounded end, a guide disc having a central conical recess receiving said rounded end of said stem, and said spring being positioned between said disc and a cap positioned over the open end of said spring receiving bore.

8. The valve as defined in claim 7 wherein said disc has opposite faces and each said face has a said conical recess therein.

9. The valve as defined in claim 4 wherein said valve body bore has an open end for receiving a bonnet projection, said bonnet having an outwardly extending shoulder for cooperatively engaging a valve body end surface when said projection is fully received in said valve body bore, said bonnet having a smooth cylindrical locating surface adjacent said shoulder for close reception in a corresponding smooth internal cylindrical locating surface adjacent said valve body end surface, said valve body bore and said bonnet projection being cooperatively threaded beyond said locating surfaces, and the peak diameter of the threads on said projection being smaller than the diameter of said internal cylindrical locating surface.

10. The valve as defined in claim 9 including a chamfer between said end surface and said internal cylindrical locating surface for defining a seal ring receiving cavity, a seal ring positioned in said cavity and being compressed therein.

11. A pressure relief valve comprising: a valve body having inlet and outlet ports, a bonnet assembled to said body and slidably guiding a poppet between closed and open positions for respectively closing and opening said inlet, said body including a bore having an open end and receiving a projection on said bonnet, said bonnet having an outwardly extending shoulder cooperatively engaging an end surface on said body when said projection is fully received in said bore, said bore having a smooth internal cylindrical locating surface adjacent said open end closely receiving a smooth external cylindrical locating surface on said bonnet adjacent said shoulder, said projection and bore being cooperatively threaded beyond said locating surfaces with the peak diameter of the threads on said projection being less than the diameter of said internal cylindrical locating surface, a chamfer extending between said end surface and said internal cylindrical locating surface to define a cavity bounded by a portion of said shoulder, a portion of said external cylindrical locating surface and the surface of said chamfer, and a seal ring compressed within said cavity.

12. The valve as defined in claim 11 wherein said bonnet has a bonnet end surface on said projection, a poppet guide bore extending into said projection from said bonnet end surface, first and second recesses extending into said projection from said bonnet end surface coincidental with said poppet guide bore, a seal ring positioned in said first recess around said poppet, and a push-in retainer secured in said second recess for retaining said seal ring in said first recess.

13. A pressure relief valve comprising: a valve body having inlet and outlet ports and a threaded bore receiving a threaded projection on a bonnet, a bonnet end surface on said projection, a poppet guide bore extending into said projection from said bonnet end surface and slidably guiding a poppet between closed and open positions for respectively closing and opening said inlet port, first and second recesses extending into said projection from said bonnet end surface coincidental with said poppet guide bore, a seal ring positioned in said first recess in surrounding sealing relationship with said poppet, a push-in retainer secured in said second recess for retaining said seal ring in said first recess, a spring receiving bore on the opposite side of a dividing wall from said poppet guide bore, said poppet having a small diameter stem extending closely through an opening in said wall into said spring receiving bore and having a rounded stem end, a disc in said spring receiving bore and having opposite faces with central conical recesses therein, said stem end being received in one of said conical recesses, and a coil spring compressed between said disc and an end cap attached to said bonnet.

14. A pressure relief valve comprising: a valve body having an inlet port and a lateral outlet port spaced from said inlet port, an enlarged bore between said ports and having a bottom adjacent said inlet port, a poppet slidably guided between closed and open positions for respectively closing and opening said inlet port, biasing means for normally biasing said poppet to said closed position, a smooth cylindrical locating surface in said bore adjacent the bottom thereof, a small cylindrical recess in the bottom of said bore inwardly of said locating surface concentric with said outlet port, an insert closely received in said recess and shaped for cooperation with the peripheral surface of said recess to define a seal ring receiving groove in which a seal ring is received, a retainer ring closely received in said locating surface in the bottom of said bore and having an inwardly extending projection partly overlying said seal ring, means for compressing said retainer ring against the bottom of said bore with said seal ring compressed between said retainer ring projection and a lateral surface on said insert which forms the bottom of said groove, and said seal ring being in surrounding sealing relationship with said poppet in said closed position thereof.

15. The valve as defined in claim 14 wherein said insert has an axial projection inwardly of said seal ring which forms an inner wall of said seal ring receiving groove and also defines a stop which is engaged by said poppet in said closed position thereof.

16. The valve as defined in claim 15 wherein said inwardly extending projection on said retainer ring and said axial projection on said insert have opposed edges between which said seal ring engages said poppet in said closed position thereof, and said opposed edges being spaced from one another a distance substantially less than the diameter of said seal ring to thereby prevent extrusion of said seal ring between said edges under the influence of fluid pressure acting on said seal ring through said inlet port.

* * * * *

UNITED STATES PATENT AND TRADEMARK OFFICE
CERTIFICATE OF CORRECTION

PATENT NO. : 4,530,373
DATED : July 23, 1985
INVENTOR(S) : Carl R. Bork, Jr., et al.

It is certified that error appears in the above-indentified patent and that said Letters Patent is hereby corrected as shown below:

Column 9, line 3, the word "outlet" should be —inlet—.

Signed and Sealed this

Sixth Day of June, 1995

Attest:

BRUCE LEHMAN

Attesting Officer

Commissioner of Patents and Trademarks